United States Patent
Nagata et al.

(10) Patent No.: US 7,791,749 B2
(45) Date of Patent: Sep. 7, 2010

(54) PRINTER HAVING A COMMUNICATION SECTION FOR OBTAINING PRINT INFORMATION NECESSARY TO PRINT

(75) Inventors: Masato Nagata, Tokyo (JP); Yasutaka Fujinuma, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1119 days.

(21) Appl. No.: 10/873,688

(22) Filed: Jun. 22, 2004

(65) Prior Publication Data

US 2004/0263896 A1 Dec. 30, 2004

(30) Foreign Application Priority Data

Jun. 26, 2003 (JP) .............................. 2003-182203

(51) Int. Cl.
- G06F 3/12 (2006.01)
- G06K 15/00 (2006.01)
- G03G 21/02 (2006.01)

(52) U.S. Cl. ................ 358/1.15; 358/1.14; 399/79
(58) Field of Classification Search ............... 358/1.14, 358/1.15; 399/79; 709/201–229
See application file for complete search history.

(56) References Cited

U.S. PATENT DOCUMENTS 6,718,490 B1 * 4/2004 Takemoto et al. ............ 714/47

| | | | |
|---|---|---|---|
| 2002/0089687 A1 * | 7/2002 | Ferlitsch et al. | 358/1.15 |
| 2002/0089692 A1 * | 7/2002 | Ferlitsch | 358/1.15 |
| 2002/0171864 A1 * | 11/2002 | Sesek | 358/1.15 |
| 2003/0154395 A1 * | 8/2003 | Miura et al. | 713/200 |
| 2004/0130744 A1 * | 7/2004 | Wu et al. | 358/1.15 |
| 2004/0165209 A1 * | 8/2004 | Aoki et al. | 358/1.14 |
| 2004/0252322 A1 * | 12/2004 | Gassho et al. | 358/1.14 |
| 2005/0030574 A1 * | 2/2005 | McVey et al. | 358/1.14 |

FOREIGN PATENT DOCUMENTS

| | | | |
|---|---|---|---|
| JP | 9226214 A | | 9/1997 |
| JP | 11-203068 A | | 7/1999 |
| JP | 2001-058445 A | | 3/2001 |
| JP | 2002215368 A | * | 8/2002 |

* cited by examiner

Primary Examiner—Twyler L Haskins
Assistant Examiner—Fred Guillermety
(74) Attorney, Agent, or Firm—Panitch Schwarze Belisario & Nadel LLP (57) ABSTRACT

A printer 10 provided with communication section 11 for obtaining print information necessary to print, from plural host devices 30 through transmission route 50, is characterized by comprising; a host ID getter 12 to get host ID able to distinguish host device which outputted said print information from other host device, with using the print information itself obtained; a trouble detector 14 able to detect trouble with judging whether printing based on said print information is possible or not; a presenter 16 to present said host ID obtained by said host ID getter 12 when printing was not judged possible by said trouble detector 14.

16 Claims, 8 Drawing Sheets

Fig.2

PRINT INFORMATION

| HOST DEVICE ID | PRINT MEDIA INF. | PRINT DATA |

Fig.3

| IP ADDRESS | USER NAME | POSITION |
|---|---|---|
| 100.101.102.103 | STAFF X | SECTION A OF FIRST FLOOR |
| 100.101.102.104 | CHIEF Y | SECTION C OF SECOND FLOOR |
| ⋮ | ⋮ | ⋮ |
| 100.101.102.108 | MANAGER Z | SECTION B OF THIRD FLOOR |

USER INFORMATION

PRINTER HAVING A COMMUNICATION SECTION FOR OBTAINING PRINT INFORMATION NECESSARY TO PRINT

BACKGROUND OF THE INVENTION

1. Field of the Invention

The present invention relates to a printer used in common among plural users, especially to what informs each user of certain information when trouble occurred.

2. Description of Related Art

A printer is connected with plural host devices such as computers, word-processors or image readers etc. through transmission route such as network etc. And, print processing request which is called print information, is sent from each host device to the printer. The printer performs certain process based on print job received. The printer performs printing to, for example, printing sheets such as printing papers, coated papers etc. or films for OHP (overhead projector).

In said print job, one of what are indicated is print media data including assignment of print media (material), assignment of size of print media, or assignment of direction to set print media of setting lengthwise or crosswise. Another one is host ID which is indicating sender of the print job together with the print media data. The rest is print data to be printed.

The printer edits print data in a prescribed output buffer based on print media information, for example, according to direction to set print media. And, the print data edited, is put out to a printing section called print engine in the printer. Then, the printing section performs printing based on print data edited. An example of this kind of printer is described in JP2001-58445.

Meanwhile, there can be an occasion when printing process is not able to be performed based on print information. This is what is called print job trouble. An example of this is an occasion when print media assigned in print information is not set in the printer. Another example of this is an occasion when direction to set print media is wrong.

In this kind of occasion, the printer is not able to perform printing process based on print job of this event. As a result, the printer stops. Then, the other users using this printer in common, is not able to print their own data, owing to this print job trouble.

For recovering this kind of print job trouble, it is necessary to specify host device which outputted this print job (that is, user of this host device). And, the user of the host device specified, must conduct operation, for example, canceling his or her print job of this event, or re-setting print media properly.

However, the conventional printer is not able to specify host device which caused print job trouble. Therefore, it is not able to quickly inform user who outputted the print job of this event, of trouble. As a result, the conventional printer had a defect that succeeding user using the printer in common is not able to use the printer for a long time.

Therefore, the present invention aimed at providing a printer which is able to get rid of the defect mentioned above.

SUMMARY OF THE INVENTION

The present invention adopted following configuration to solve problem mentioned above.

According to one aspect of the present invention, there is provided a printer provided with communication section for obtaining print information necessary to print, from plural host devices through transmission route, comprising; a host ID getter to get host ID able to distinguish host device which outputted said print information from the other devices with using the print information itself obtained, a printing possibility judging section to judge whether printing based on said print information is possible or not, a presenter to present said host ID obtained by said host ID getter when printing was not judged possible by said printing possibility judging section.

According to another aspect of the present invention, there is provided a printer provided with communication section for obtaining print information necessary to print, from plural host devices through transmission route, comprising; a host ID getter to get host ID able to distinguish host device which outputted said print information from the other devices with using the print information itself obtained, a trouble detector able to detect trouble with judging whether printing based on said print information is possible or not, a presenter to present said host ID obtained by said host ID getter when printing was not judged possible by said trouble detector.

According to the other aspect of the present invention, there is provided a printer comprising; a communication section provided with plural connecting terminals corresponding to each of plural host devices, for obtaining print information necessary to print, from plural host devices, a host ID getter to get information indicating each connecting terminal receiving said print information, as host ID able to distinguish host device which outputted said print information from the other devices, a trouble detector able to detect trouble with judging whether printing based on said print information is possible or not, a presenter to present said host ID obtained by said host ID getter when printing was not judged possible by said trouble detector.

DESCRIPTION OF THE PREFERRED EMBODIMENTS

Figure 1:
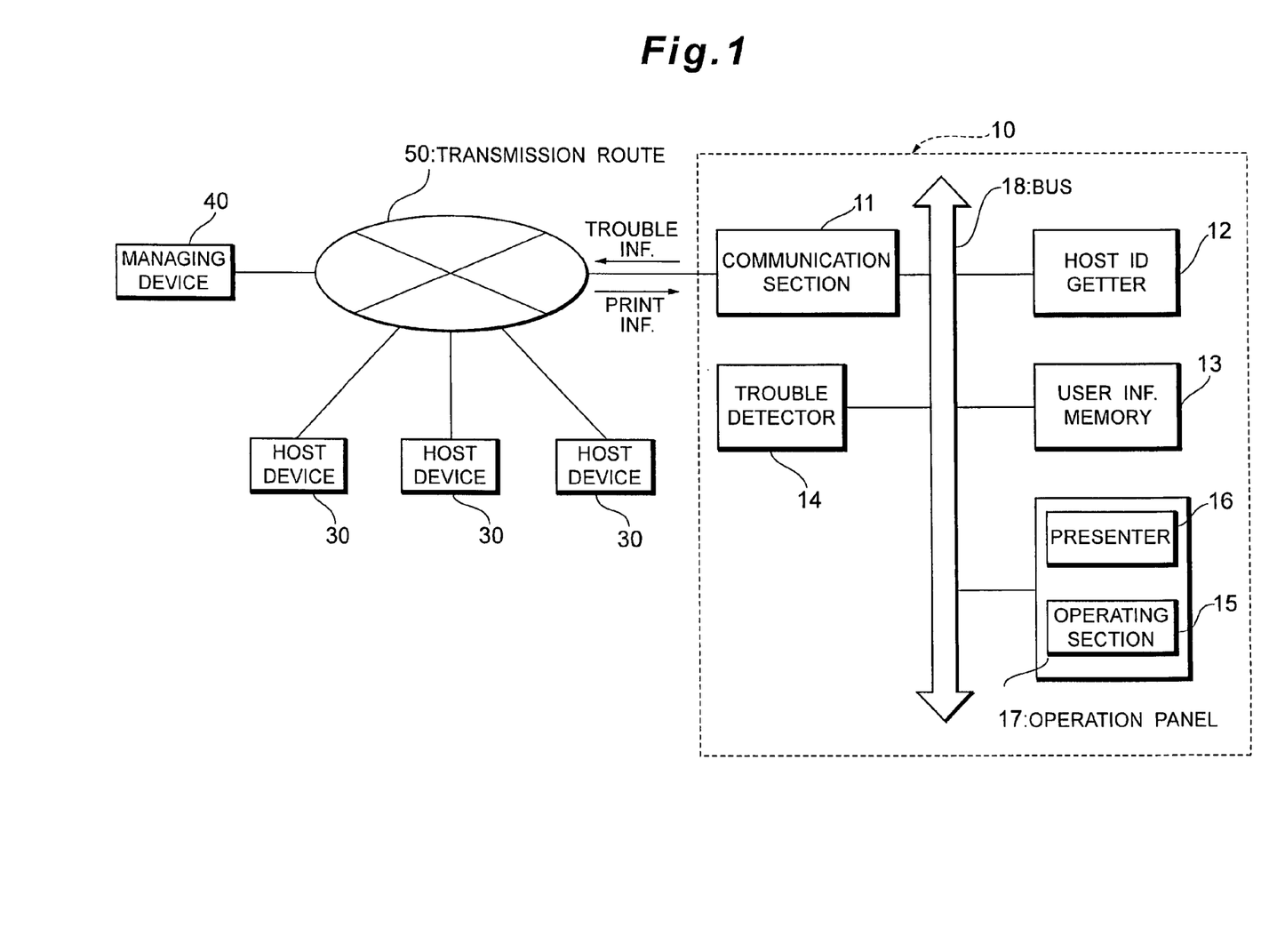
FIG. 1 is a block diagram showing a printer of Embodiment 1.

Hereinafter, a printer 10, 60, or 70 of present invention will be described, referring to the above drawings (FIG. 1, 5, 7).

A printer 10, 60, or 70 of present invention is connected with a transmission route 50 comprising a network etc. And, plural host devices 30 comprising computer, word-processor, image reader etc. are connected with the transmission route 50. Further, a managing device 40 is connected with the transmission route 50, for a system manager to manage the printer 10, 60, or 70, transmission route 50, and each host device 30. A functional diagram of printer 10 in connection with these devices, is shown in FIG. 1.

Embodiment 1

Configuration

The printer 10 comprises a communication section 11 performing communication in order to obtain print processing request (print information) which is called a print job, through transmission route 50 from one of host devices 30; a host ID getter 12 obtaining a host ID able to identify a sender who sent the print information, from the print information obtained from one of the host devices 30 by communication; a user information memory 13 holding user information which each ID and user name of host device 30 corresponding to respectively; a trouble detector 14 acting as a printing possibility judging section (set forth in the claims) for judging whether printing is possible or not, by a process based on print information obtained; and an operation panel 17 comprising an operating section 15 to receive operation inputted by an operator and a presenter 16 to present information to the operator. Each of sections mentioned above, are connected with bus 18 including data bus and system bus etc. And, access to bus 18 by each section is controlled by a bus controller not shown in the drawing. Further, a print engine not shown in the drawing, is connected with the bus 18. And, the print engine performs printing on a print medium.

Next, each section will be described.

Figure 2:
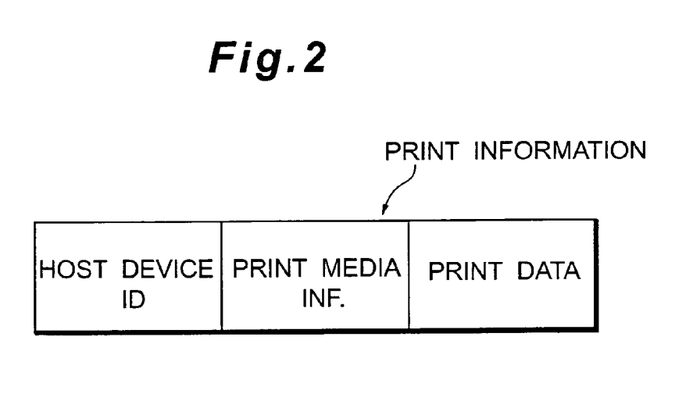
FIG. 2 is a diagram showing composition of print information.

The communication section 11 obtains print information through transmission route 50 from one of host devices 30. This print information comprises, as shown in FIG. 2, host device ID, print media information concerning characteristics of print media, and print data comprising character code corresponding to image of character to be printed.

The host device ID mentioned above, comprises IP address for identifying each of host devices 30 connected with the transmission route 50, or information which is called MAC address (Media Access control Address) and which is given individually to each device.

The print data comprises character code of character to be printed, or RGB value of image data to be printed etc.

The print media information comprises information about kind of print media selected by an operator of either of host devices 30 from choices, for example, high quality sheet, luster sheet or film for OHP etc. Further, the print media information comprises size, for example, A4, B5 etc. thickness of print media, lengthwise setting or crosswise setting of print media, number of sets of prints etc.

For example, it is provided that said print media information indicates sheet size of A4 of print media, though size of print sheet which is set in sheet feeder cassette of printer is B5. In this occasion, the printer is not able to print, because sheet size indicated by print media information does not accord with size of sheets set in sheet feeder cassette. Then, a trouble of print job occurs. And, this kind of trouble of print job interrupts printing process, resulting in failure of printing with the print media. Further, this trouble of print job interrupts print job sent by other operators who use the printing device 10 in common, after this trouble once occurred, resulting in failure of printing with a print media, whatever size or sheet position of the print media is assigned in the print job. And, a prescribed recovery operation must be performed, in order to take this trouble away.

When a trouble of print job mentioned above occurred, the communication section 11 informs the host device 30 and managing device 40 respectively of existence of fact of the trouble.

The host ID getter 12 gets IP address as host ID, from the print information obtained by the communication section 11. And, the IP address is temporarily kept in the host ID getter 12.

Figure 3:
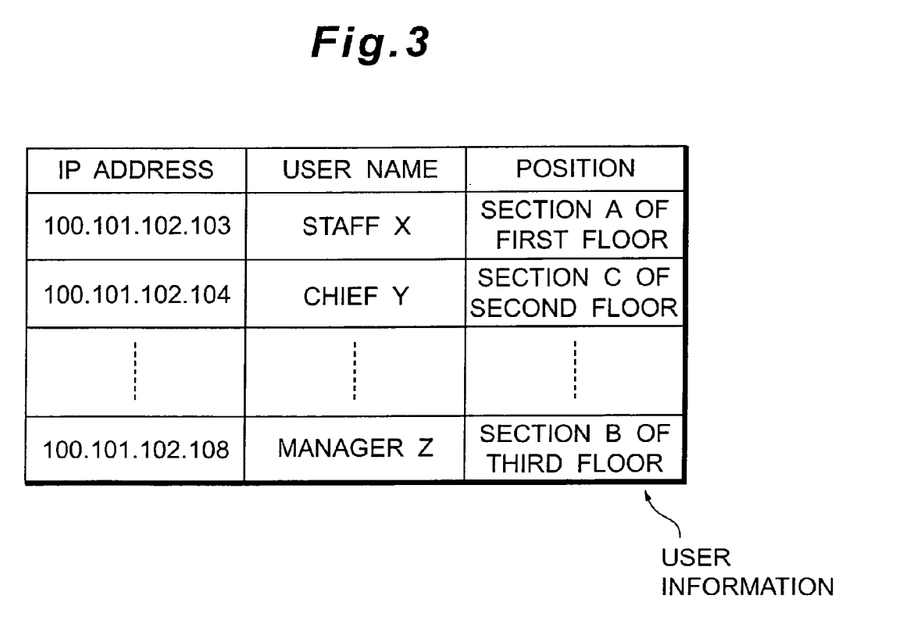
FIG. 3 is a diagram showing composition of user information.

The user information memory 13 memorizes IP address of host device to perform communication through the transmission route 50. And, it also memorizes user name of the host device, and the place where the host device is located. FIG. 3 shows user information comprising IP address, user name, and place of host device 30. In FIG. 3, user name is attached with post name, and place is expressed by floor number and section number, as each floor is divided into several sections. However, the content of user information can be modified corresponding to circumstance of system where a printer is used in common. However, it is indispensable to relate user information with host ID.

The user information memorized in user information memory 13, is inputted by an operator who operates with operation panel 17, with making relationship between IP address, user name of host device 30 which IP address corresponds with, and place where host device 30 is located. The user information mentioned above, is not only inputted from operation panel. But, the user information is also able to be made, for example, in host device 30 or managing device 40, with making relationship between IP address, user name of host device 30 which IP address corresponds with, and place where host device 30 is located. After that, the user information is sent to the printer 10 through transmission route 50. And, the user information put out from host device 30 or managing device 40, is kept in user information memory 13 of printer 10. Incidentally, the user information memory 13 comprises HDD (Hard Disk Drive) or nonvolatile memory with large capacity.

The trouble detector 14 detects what is called print job trouble, that is, interruption of printing with print media assigned by the operator or user of host device 30. This detection is achieved by process of using print information kept in communication section 11. Therefore, detection of trouble occurring to the printer 10, is not performed.

The trouble detector 14 informs presenter 16 and communication section 11 respectively of print job trouble, when it is detected.

The operation panel 17 comprising an operating section 15 and presenter 16, is used when the operator performs various setting.

When a print job trouble occurred, the trouble detector 14 detected print job trouble and the presenter 16 is informed of the print job trouble detected. Then, user name of host device which outputted the print job and place of the host device, are presented at presenter 16 of operation panel 17. In order to get setting place of host device 30 which outputted print job causing trouble, and user name of host device 30; referred to, is user information in user information memory 13 corresponding to IP address got by host ID getter 12.

Further, the presenter 16 makes a presentation of a fact of an event (content of print job trouble) other than presentation of place and user name mentioned above. With these presentation, the user of host device causing trouble is specified. And, from other user waiting for recovery of trouble, to the user who caused print job trouble; occurrence of trouble is informed. Therefore, the user informed of the information of trouble, is able to quickly perform; for example, re-setting print media in sheet feeder cassette properly, or correcting direction of print media appropriately, or canceling print job.

<Operation>

Figure 4:
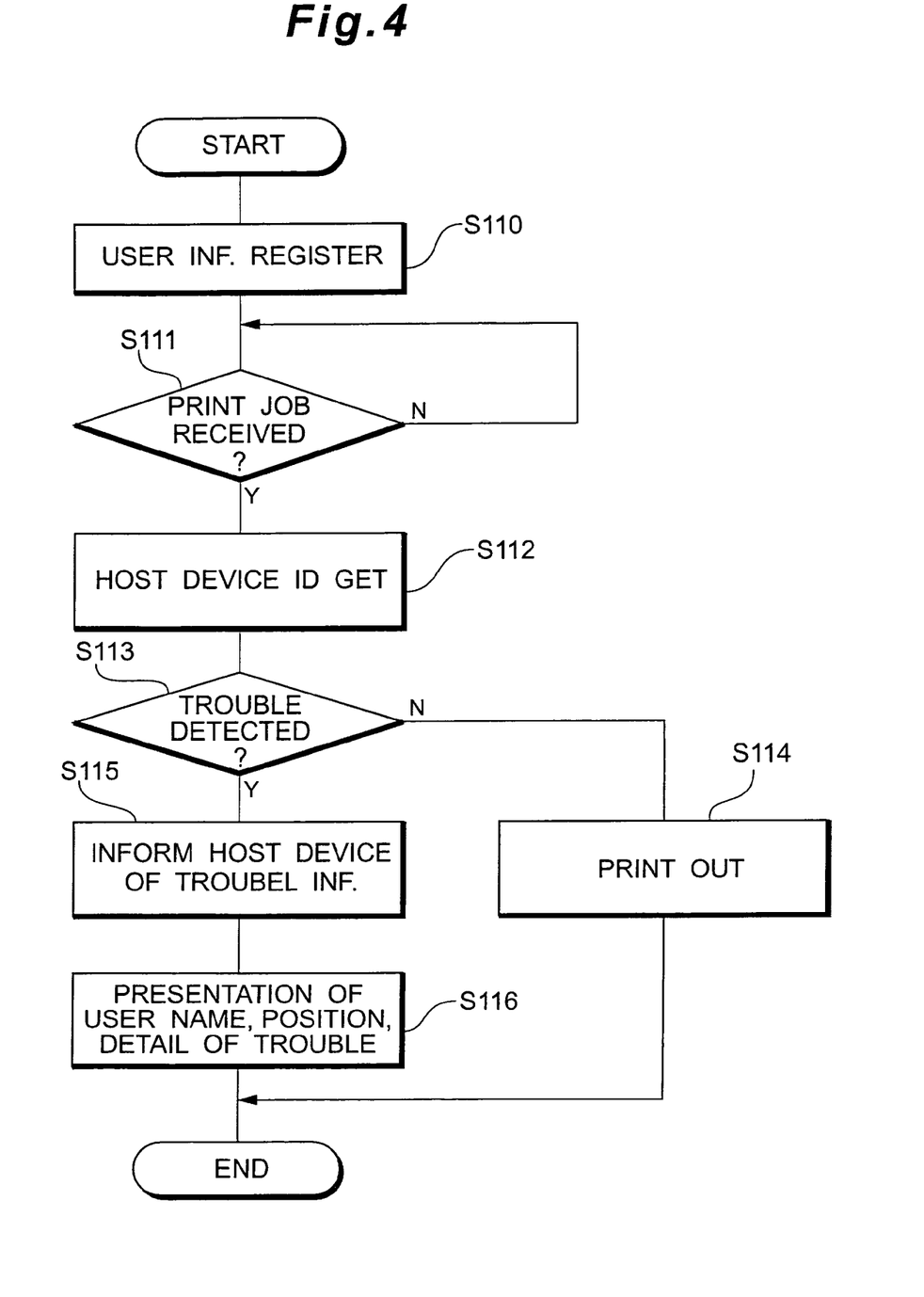
FIG. 4 is a flow chart showing operation of the printer of Embodiment 1.

Next, operation of printer 10 of present invention is described referring to flow chart of FIG. 4.

The operation panel 17 is operated. Then, user information comprising IP address of each host device 30, user name of the host device 30, setting place of the host device 30 etc. is registered. For this purpose, the user information is held in user information memory 13 (step S110).

Further, IP address of managing device 40 for system manager, is registered. By registering IP address of managing device 40, in the occasion when print job trouble occurred, the managing device 40 is informed of the occurrence of trouble.

The communication section 11 judges whether print job (print information) is received or not (step S111).

Usually, the user of host device who are going to put out print information, sets the print media for printing, in sheet feeder cassette; before putting out the print information from host device 30. This setting of print media, is performed corresponding to content of print media information included in the print information. However, if the user forgot setting of print media or if print media is not set according to the print media information, then print job trouble occurs.

When the communication section 11 obtained print information, the print information is sent to host ID getter 12. The host ID getter 12 gets host ID from print information obtained. Here, the host ID comprises IP address etc. able to identify host device 30 which outputted the print information (step S112).

The trouble detector 14 judges whether print job trouble are going to occur or not, by performing process based on print information obtained by communication section 11 (step S113).

As for detection of print job trouble, it is performed by using sensors already known. For example, kind, size, direction etc. of print media set in sheet feeder cassette, at first. Next, result of their detection and print media information of print information are compared. And, if difference is detected, then it is judged that print job trouble will occur.

By this judgement, if it is not judged that print job trouble will occur, then printing to the print media with print engine not shown in the drawing, based on print data of print information (step S114).

On the other hand, if occurrence of print job trouble, which is going to occur, is detected, for example, by the reason that print media is not set in the sheet feeder cassette; then trouble information letting know absence of print media in sheet feeder cassette, is informed from communication section 11 to host device 30. This information is informed to host device of IP address according to IP address included in host ID of print information.

The user of host device 30 who received this information, sets appropriate print media in sheet feeder cassette, in order to recover print job trouble, and in order to perform printing according to print media information assigned as the user prefers. Thereby, the user of host device 30 is able to know occurrence of trouble, with using print job outputted by the user himself or herself. And, treatment of recovery from print job trouble is able to be performed quickly.

In addition to this information to host device 30, the communication section 11 informs the managing device 40 of trouble information. By this information, a system manager of managing device 40 is able to teach adequate use of printer 10 to the user of host device 30 who caused the trouble. And, according to necessity, the manager is able to perform adequate treatment to the printer 10, so as to recover print job trouble quickly (step S115).

Further, when it was judged that print job trouble is going to occur, the presenter 16 refers to the user information of user information memory 13. Then, the presenter 16 obtains user name and setting place of host device 13, which are corresponding to host ID (IP address) got by user information memory 13. And, these user name and place obtained, are presented at presenter 16. For example, in the occasion when number of characters able to be presented at presenter 16 is limited, being unable to present user name and place at a time; there are methods of alternative presentation called blinking presentation, or of rotational presentation presenting each line of characters rotationally.

Further, the presenter 16 presents content showing event of print job in addition to user name and place (step S116).

Thereby, other users is able to know the user name of user of host device causing print job trouble. Further, they are able to know setting place of host device used by the user. Therefore, they are able to inform the user who caused the event, of occurrence of trouble. And, they are able to let the user perform recovery coping with the trouble. Thereby, the printer 10 of present invention is able to avail succeeding user without bothering them.

Embodiment 2

Configuration

The printer 60 of Embodiment 2 is characterized by comprising a shunting section 19 to shunt temporarily print job (print information) which caused trouble, so as to prefer the succeeding print job.

Figure 5:
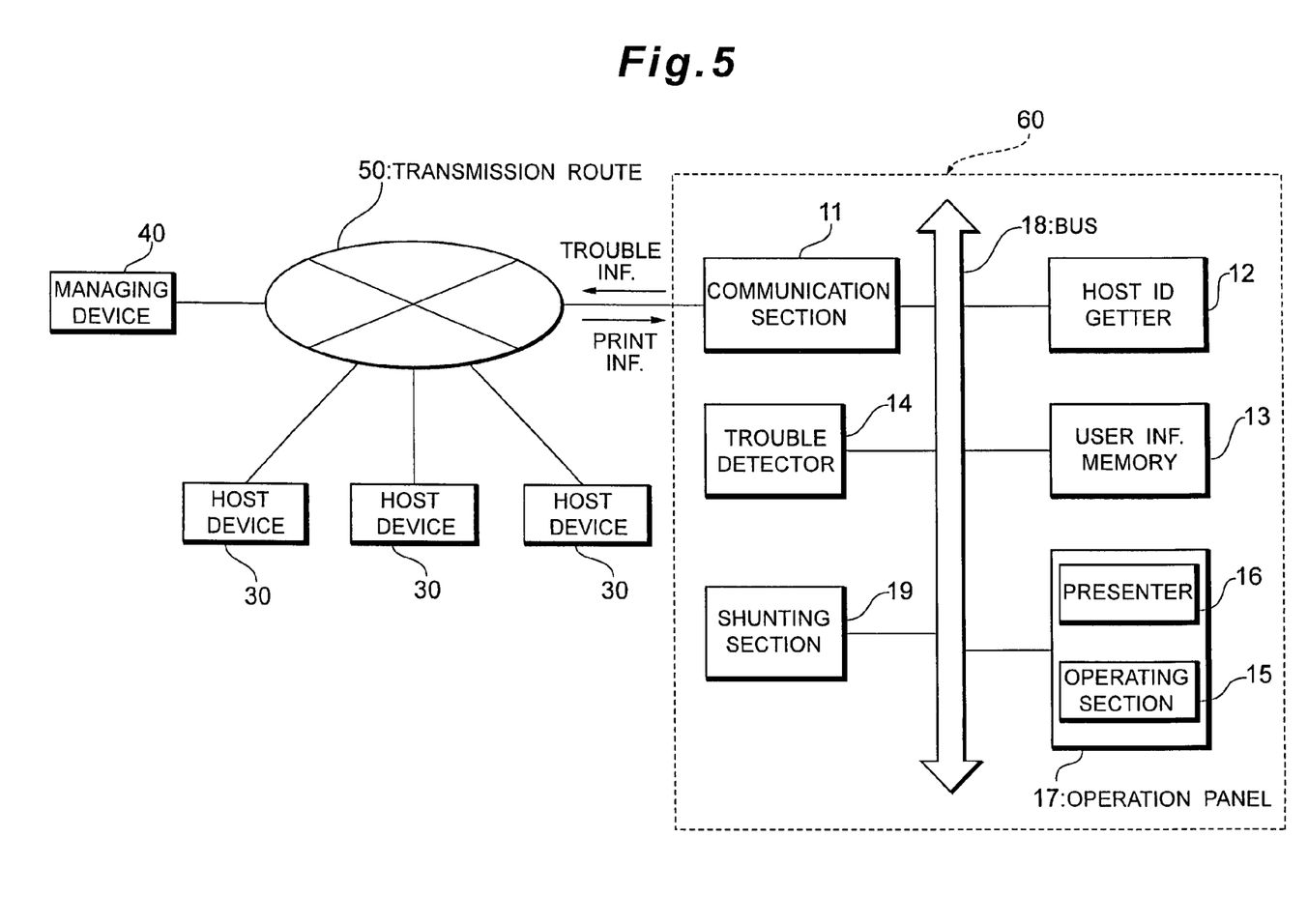
FIG. 5 is a block diagram showing a printer of Embodiment 2.

FIG. 5 is a block diagram of printer 60 of Embodiment 2.

The printer 60 comprises, similarly as Embodiment 1, a communication section 11; a host ID getter 12 obtaining a host ID, from the print information obtained from one of the host devices 30 by communication section 11; a user information memory 13 holding user information which each ID, user name of host device and setting place of each host device 30 corresponding to respectively; a trouble detector 14 to detect occurrence of trouble, by a process based on print information obtained; an operation panel 17 comprising an operating section 15 to receive operation inputted by an operator and a presenter 16 to present information to the operator; a shunting section 19 to shunt temporarily print information causing print job trouble; and a bus 18 to connect electrically each of sections mentioned above.

The communication section 11, host ID getter 12, user information memory 13, trouble detector 14, operation panel 17 comprising operating section 15 and presenter 16, and bus 18 are same as Embodiment 1 mentioned above. So, their description is omitted.

The shunting section 19 characterizing Embodiment 2 comprises an HDD able to read and to write, or other magnetic disc or involatile memory; so as to shunt temporarily print job (print information) when the print job caused trouble. The process of shunting print job is performed, for example, by control according to direction inputted at operation panel, by remote control from host device 30 through transmission route 50 etc.

When direction of shunting print job is set forth, information informing that print job is shunted, is put out from communication section 11 to host device 30 which put out the print job. Thereby, the user of host device 30 which put out the print job, is able to know the fact that printing was not performed and that the print job was shunted.

The print job shunted in the shunting section 19, is held in the shunting section 19 until direction of relief of shunting is set forth from the user. However, at a time when the trouble is relieved by setting print media properly in sheet feeder cassette, printing is performed according to print job shunted. In this occasion, the fact that printing was performed, is informed from communication section to host device 30, after shunting, so as to inform the user that printing was performed.

<Operation>

Figure 6:
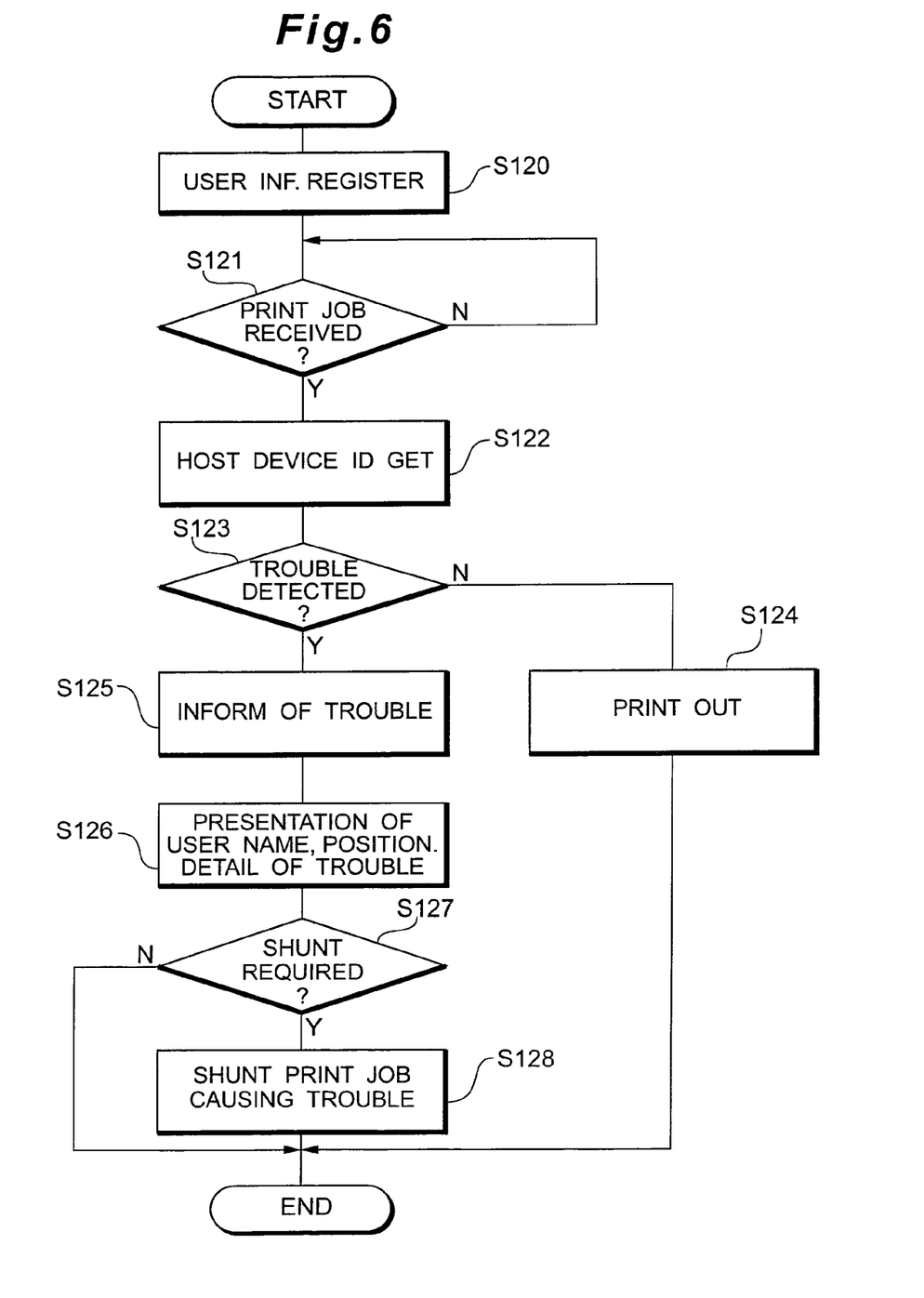
FIG. 6 is a flow chart showing operation of the printer of Embodiment 2.

Next, operation of printer 60 of Embodiment 2 is described referring to flow chart of FIG. 6.

The operation panel 17 is operated. Then, user information comprising IP address of each host device 30, user name of the host device 30, setting place of the host device 30 etc. is registered. For this purpose, the user information is held in user information memory 13 (step S120). Further, IP address of managing device 40 for system manager, is registered.

The communication section 11 judges whether print job (print information) is received or not (step S121).

When the communication section 11 obtained print information, the print information is sent to host ID getter 12. The host ID getter 12 gets host ID from print information obtained. Here, the host ID comprises IP address etc. able to identify host device 30 which outputted the print information (step S122).

After the host ID was obtained, the trouble detector 14 judges whether print job trouble are going to occur or not, by performing process based on print information obtained by communication section 11 (step S123).

As for detection of print job trouble, it is performed by using sensors already known. For example, kind, size, direction etc. of print media set in sheet feeder cassette, at first. Next, result of their detection and print media information of print information are compared. And, if difference is detected, then it is judged that print job trouble will occur.

By this judgement, if it is not judged that print job trouble will occur, then printing to the print media, based on print data of print information is performed (step S124).

On the other hand, if occurrence of print job trouble is detected, for example, by the reason that print media is not set in the sheet feeder cassette; then trouble information letting know absence of print media in sheet feeder cassette, is informed from communication section 11 to host device 30 (step S125). Thereby, the user of host device 30 is able to know occurrence of trouble, with using print job outputted by the user himself or herself. And, treatment of recovery from print job trouble is able to be performed quickly. A system manager of managing device 40 is able to teach adequate use of printer 60 to the user of host device 30 who caused the trouble. And, according to necessity, the manager is able to perform adequate treatment to the printer 60, so as to recover print job trouble quickly.

Further, when it was judged that print job trouble is going to occur, the presenter 16 refers to the user information of user information memory 13. Then, the presenter 16 obtains user name, setting place of host device 13, and content showing event of print job which are corresponding to host ID (IP address) got by user information memory 13. And, these items obtained, are presented at presenter 16 (step S126).

Thereby, other users is able to know the user name of user of host device causing print job trouble. Further, they are able to know setting place of host device used by the user. Therefore, they are able to inform the user who caused the event, of occurrence of trouble. And, they are able to let the user perform recovery coping with the trouble.

Moreover, when the user or system manager are away from their place, the print job trouble cannot be informed to them. In this occasion, succeeding user judges whether print job causing trouble should be shunted or not (step S127).

When the succeeding user judged that the print job should be shunted; the print job (print information) causing trouble, is shunted in shunting section 19 by the user operating at operation panel (step S128).

By shunting print job causing trouble, the succeeding user is able to perform printing without waiting for recovery of trouble.

Embodiment 3

Configuration

The printer 70 of Embodiment 3 is characterized by making information of charging, so as to charge a host device which put out print job causing trouble, depending on time when the trouble of print job occurred.

Figure 7:
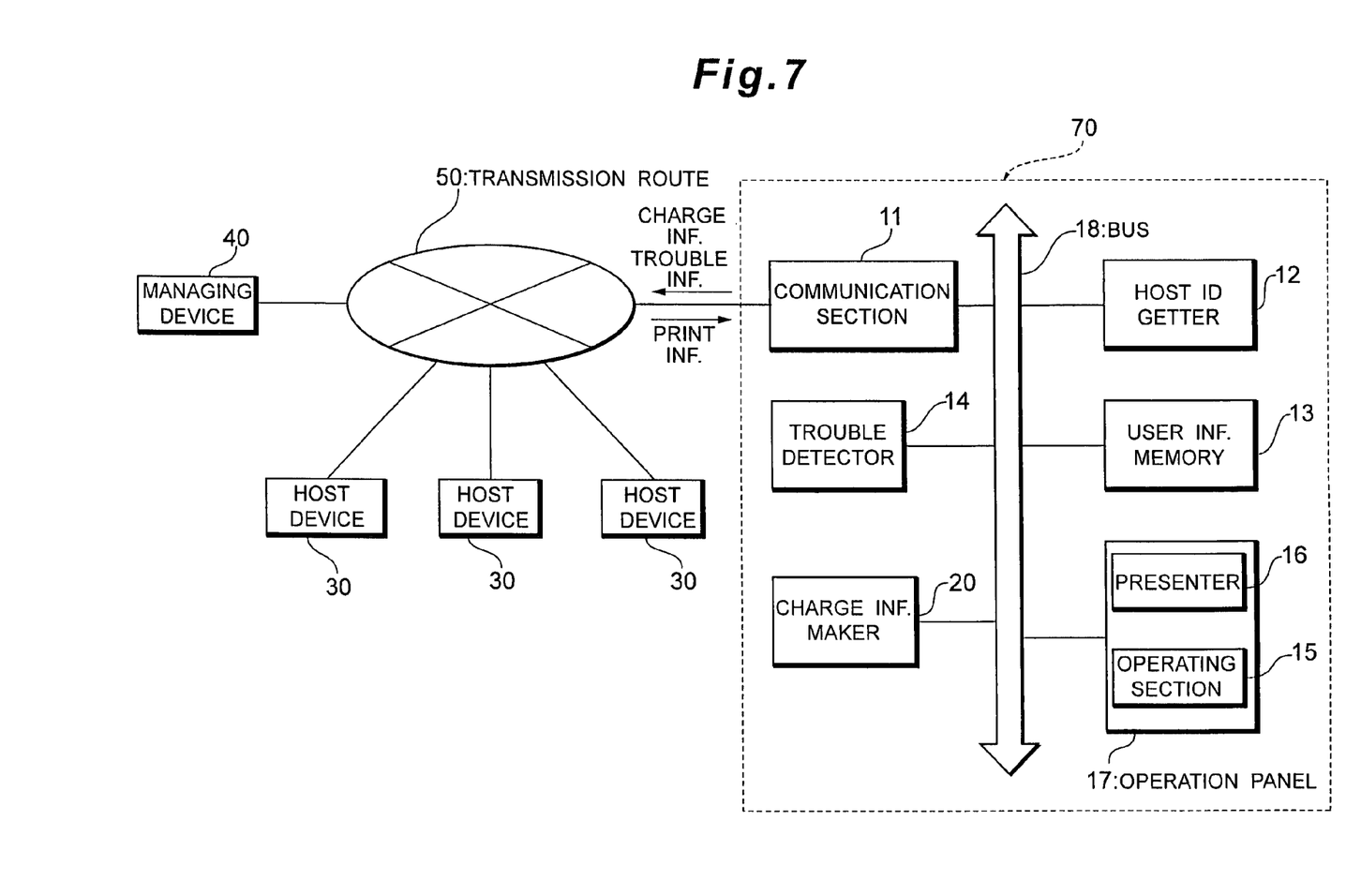
FIG. 7 is a block diagram showing a printer of Embodiment 3.

FIG. 7 is a block diagram of printer 70 of Embodiment 3.

The printer 70 comprises, similarly as Embodiment 1, a communication section 11; a host ID getter 12 obtaining a host ID, from the print information obtained from one of the host devices 30 by communication section 11; a user information memory 13 holding user information which each ID, user name of host device and setting place of each host device 30 corresponding to respectively; a trouble detector 14 to detect occurrence of trouble, by a process based on print information obtained; an operation panel 17 comprising an operating section 15 to receive operation inputted by an operator and a presenter 16 to present information to the operator; a charging information making section 20 to put out charge calculated depending on time until recovery, as charging information; and a bus 18 to connect electrically each of sections mentioned above.

The communication section 11, host ID getter 12, user information memory 13, trouble detector 14, operation panel 17 comprising operating section 15 and presenter 16, and bus 18 are same as Embodiment 1 mentioned above. So, their description is omitted.

The charging information making section 20 characterizing Embodiment 3 makes charging information of charge calculated by: time interval, from the time when process of performing printing stopped by a print job trouble as trouble detector 14 detected a print job trouble, until the time when the trouble is recovered; multiplied by a prescribed charge rate. The charging information is sent from the communication section 11 to the managing device 40. A system manager of the managing device 40 charges the user of host device 30 based on charging information obtained. Thereby, the user caused trouble, becomes to set print media in sheet feeder cassette carefully, before putting out print job.

<Operation>

Figure 8:
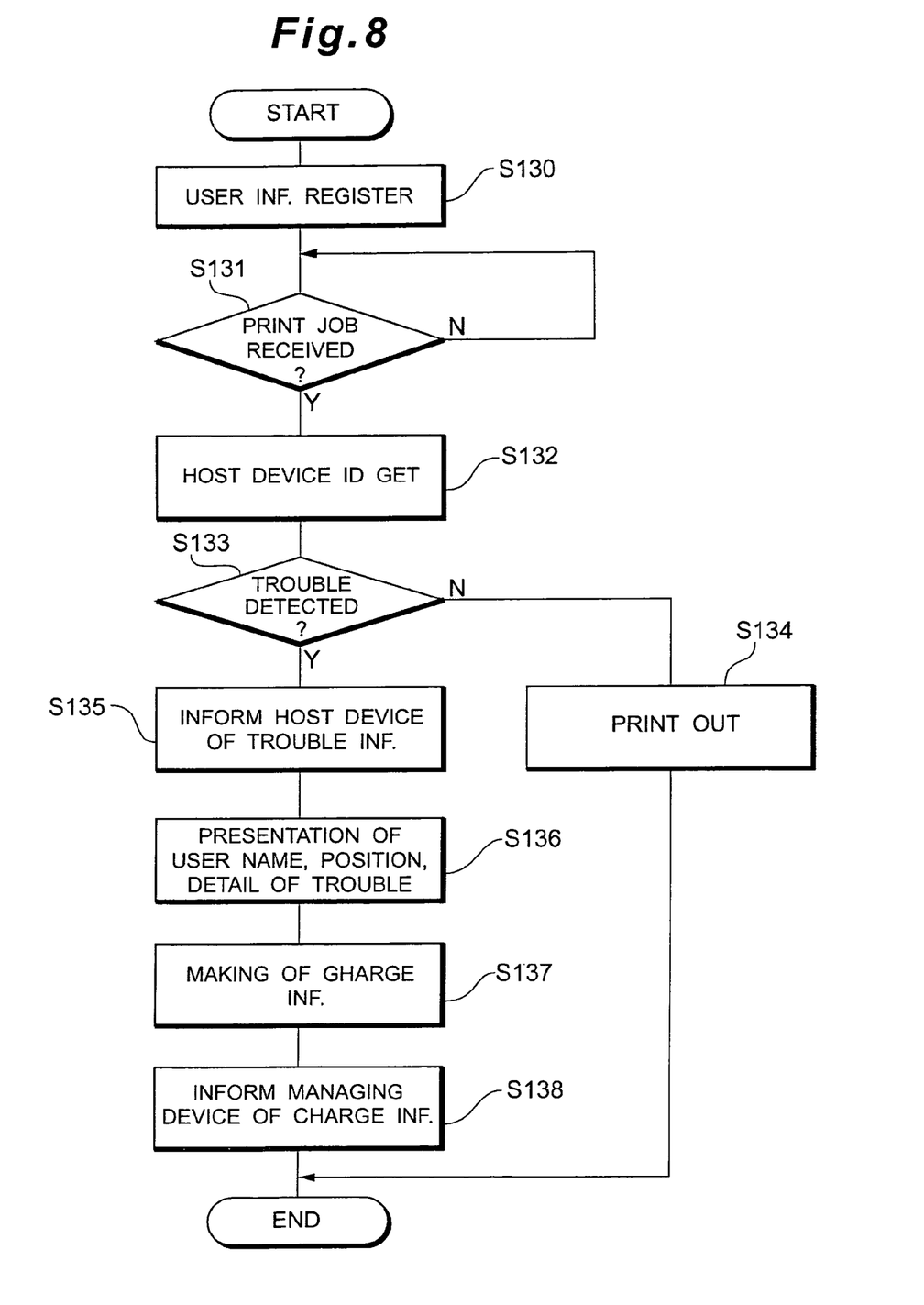
FIG. 8 is a flow chart showing operation of the printer of Embodiment 3.

Next, operation of printer 70 of Embodiment 3 is described referring to flow chart of FIG. 8.

The operation panel 17 is operated. Then, user information comprising IP address of each host device 30, user name of the host device 30, setting place of the host device 30 etc. is registered. For this purpose, the user information is held in user information memory 13 (step S130). Further, IP address of managing device 40 for system manager, is registered.

The communication section 11 judges whether print job (print information) is received or not (step S131).

When the communication section 11 obtained print information, the print information is sent to host ID getter 12. The host ID getter 12 gets host ID from print information obtained. Here, the host ID comprises IP address etc. able to identify host device 30 which outputted the print information (step S132).

After the host ID was obtained, the trouble detector 14 judges whether print job trouble are going to occur or not, by performing process based on print information obtained by communication section 11 (step S133). As for detection of print job trouble, it is performed by using sensors already known. For example, kind, size, direction etc. of print media set in sheet feeder cassette, are detected, at first. Next, result of their detection and print media information of print information are compared. And, if difference is detected, then it is judged that print job trouble will occur.

By this judgement, if it is not judged that print job trouble will occur, then printing to the print media, based on print data of print information is performed (step S134).

On the other hand, if occurrence of print job trouble is detected, for example, by the reason that print media is not set in the sheet feeder cassette; then trouble information letting know absence of print media in sheet feeder cassette, is informed from communication section 11 to host device 30 (step S135). Thereby, the user of host device 30 is able to know occurrence of trouble, with using print job outputted by the user himself or herself. And, treatment of recovery from print job trouble is able to be performed quickly. A system manager of managing device 40 is able to teach adequate use of printer 70 to the user of host device 30 who caused the trouble. And, according to necessity, the manager is able to perform adequate treatment to the printer 70, so as to recover print job trouble quickly.

After, print job trouble is informed, the presenter 16 refers to the user information of user information memory 13. Then, the presenter 16 obtains user name, setting place of host device 13, and content showing event of print job which are corresponding to host ID (IP address) got from user information memory 13. And, these items obtained, are presented at presenter 16 (step S136).

Thereby, other users is able to know the user name of user of host device causing print job trouble. Further, they are able to know setting place of host device used by the user. Therefore, they are able to inform the user who caused the event, of occurrence of trouble. And, they are able to let the user perform recovery coping with the trouble.

When print job trouble is detected by trouble detector 14, the charging information making section 20 makes charging information of charge calculated by: time interval, from the time when process of performing printing stopped by a print job trouble, until the time when the trouble is recovered; multiplied by a prescribed charge rate (step S137).

After making charge information, the charging information is sent from the communication section 11 to the managing device 40 (step S138). A system manager of the managing device 40 informed of charging information, charges the user of host device 30 causing trouble, based on charging information obtained. By charging, the user caused trouble, becomes to set print media in sheet feeder cassette carefully, before putting out print job. Thereby, occurrence of print job trouble decreases. And, the print server 70 used in common, can be used smoothly and without needless delay.

The charging information mentioned above, can be informed, for example, to host device 30, not only to managing device 40. Further, charging information can be presented at presenter 16 of the printer 70. In either occasion, as mentioned above, the user who caused print job trouble, by being charged, becomes to set print media in sheet feeder cassette carefully. Thereby, occurrence of print job trouble decreases.

Other Embodiments

Figure 9:
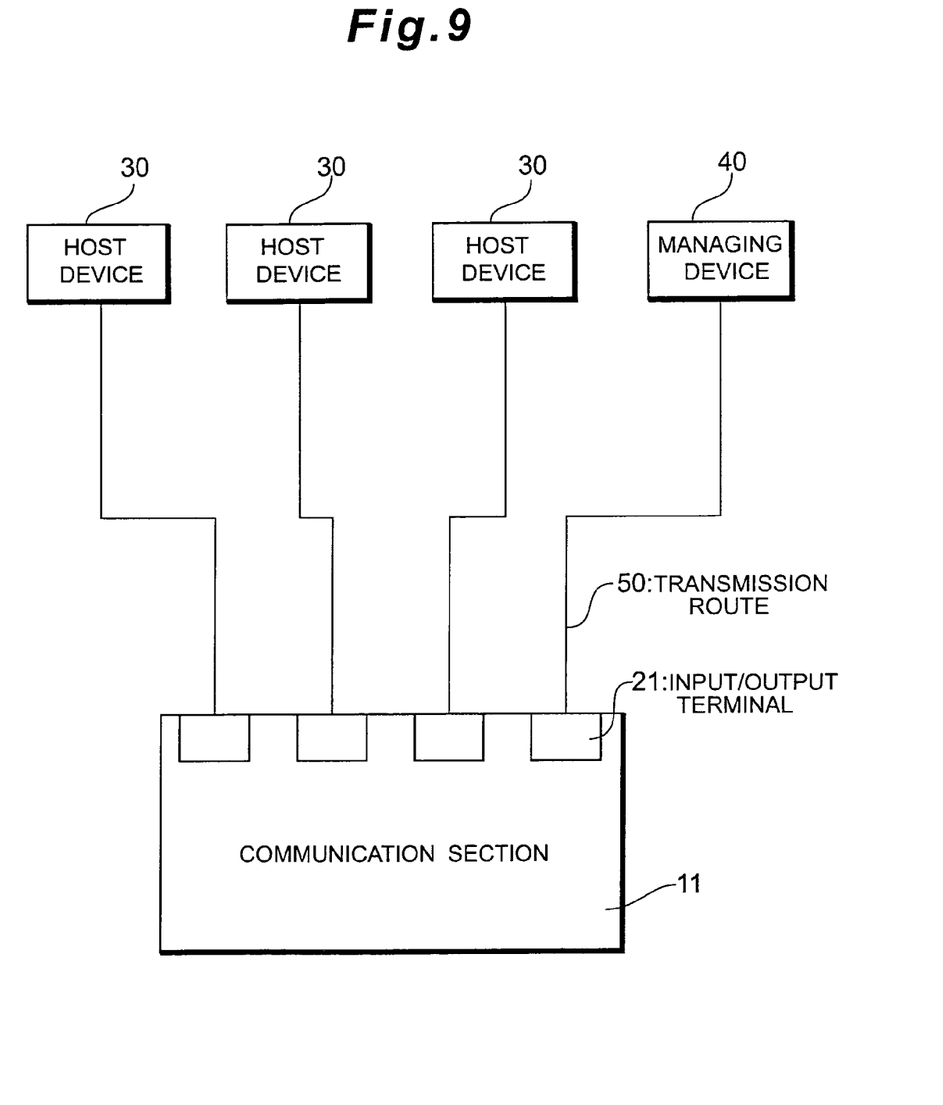
FIG. 9 is a diagram showing a communication section having input/output terminals corresponding to host devices and a managing device.

In embodiments mentioned above, the host ID getters obtain host ID from printing information. However, for example, it can be obtained by following method. As shown in FIG. 9, there is a system where communication section 11 has plural input/output terminals 21. And, each of host devices 30 or managing device 40 are connected with one of input/output terminals 21. Here, host devices 30 or managing device 40 are connected with each other in fixed relationship. Then, each of host devices 30 or managing device 40 can be detected with using this relationship. And, as a result of this detection, each host ID can be obtained.

Incidentally, each input/output terminal 21 mentioned above, is serial interface, for example, RS232C interface, or parallel interface etc.

In embodiments mentioned above, user information comprising user name of user of host device which outputted print job causing trouble, and place of host device, is referred, based on host ID. And, result of reference is presented at presenter 16. However, only host ID, for example, IP address etc. which can distinguish each device 30, can be presented.

In embodiments mentioned above, trouble information is informed by communication section 11, and information which can distinguish host device, is presented at presenter 16. However, only presentation of host device at presenter 16 can be performed. Thereby, manufacturing cost can be cut down.

For example, accumulated occurring number of print job trouble per each host device, occurring date and time of print job trouble etc. can be added to content of trouble information.

Further, after recovering from print job trouble, spent time from stopping to recovering, can be informed to host device 30 or managing device 40, as trouble information.

Moreover, history of print job trouble can be informed, as trouble information, other than above trouble information. For example, when occurring number of times of trouble exceeded a prescribed threshold value, trouble information mentioned above is informed at a prescribed data and a prescribed time or at a time requested by host device 30 or managing device 40. Further, this kind of trouble information can be printed by printer.

Furthermore, occurrence of print job trouble reached to a prescribed number of times, for example, an instruction document made beforehand, can be informed to host device 30. In this instruction document, attention for avoiding print job trouble is included. And, when a user reads this instruction document, he or she can use the printer with adequate manner. Thereby, print job trouble decreases. Therefore, the other user can use a common printer smoothly without taking disadvantage of print job trouble.

What is claimed is:

1. A printer provided with a communication section for obtaining print information necessary to print from plural host devices through a transmission route, comprising;

a host ID getter to get a host ID able to distinguish identify the one of the host devices which outputted said print information, a user information memory to hold user information indicating the one of the host devices corresponding to the host ID, a printing possibility judging section to judge the occurrence of print job trouble, said trouble being defined by whether printing based on said print information is possible or not, a presenter to present said host ID obtained by said host ID getter and the user information corresponding to said host ID when printing was not judged possible by said printing possibility judging section, and a charging information making section to make charging information of charge depending on stopping time of the printer which is stopped by the print information, the stopping time being the interval of time starting from the time when the judging section judges the occurrence of print job trouble to the time when trouble is recovered, wherein said presenter presents said charging information.

2. The printer according to claim 1, wherein said user information indicates user name of host device.

3. The printer according to claim 1, wherein said user information indicates user place of host device.

4. The printer according to claim 1, wherein said communication section informs said host device which caused trouble, of content of trouble detected, as trouble information, when printing is not judged possible.

5. The printer according to claim 4, wherein said communication section informs a managing device which manages said transmission route and host devices connected to the transmission route, of content of trouble detected, as trouble information, when printing is not judged possible.

6. The printer according to claim 4, wherein said communication section informs of content of trouble detected and of user information obtained, as trouble information.

7. The printer according to claim 1, wherein said communication section informs said host device which caused trouble, of said charging information.

8. The printer according to claim 1, wherein said communication section informs a managing device which manages said transmission route and devices connected with the transmission route, of said charging information.

9. The printer according to claim 1, wherein said communication section informs said host device of instruction document for instructing host device which caused troubles more than a prescribed times.

10. The printer according to claim 1, further comprising;
a shunting section to temporarily shunt said print information going to cause trouble, based on indication from other user.

11. The printer according to claim 10, wherein said shunting section continues to shunt until a user indicates to relieve shunting.

12. The printer according to claim 10, wherein said printer performs printing based on said print information shunted in said shunting section, when trouble was relieved.

13. The printer according to claim 10, wherein said communication section informs said host device of fact that said print information going to cause trouble was shunted.

14. The printer according to claim 1, further including a shunting section to temporarily shunt the identified print job that cannot be printed.

15. The printer according to claim 1, further including a counter which counts a number of occurrences of print job trouble per each host device.

16. The printer according to claim 15, wherein the communication section sends an instruction document to a corresponding host device when the number of occurrences of print job trouble for the corresponding host amounts to a predetermined number.

* * * * *